United States Patent
Park et al.

(10) Patent No.: US 9,584,283 B2
(45) Date of Patent: Feb. 28, 2017

(54) METHOD AND APPARATUS FOR TRANSMITTING INTERFERENCE INFORMATION

(71) Applicant: LG Electronics Inc., Seoul (KR)

(72) Inventors: Hanjun Park, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 14/324,317

(22) Filed: Jul. 7, 2014

(65) Prior Publication Data

US 2015/0029958 A1    Jan. 29, 2015

Related U.S. Application Data

(60) Provisional application No. 61/858,580, filed on Jul. 25, 2013.

(51) Int. Cl.
| | | |
|---|---|---|
| H04L 5/00 | (2006.01) | |
| H04J 11/00 | (2006.01) | |
| H04W 24/02 | (2009.01) | |

(52) U.S. Cl.
CPC .......... *H04L 5/0053* (2013.01); *H04J 11/0053* (2013.01); *H04L 5/0094* (2013.01); *H04J 11/0026* (2013.01); *H04L 5/0023* (2013.01); *H04L 5/0035* (2013.01); *H04W 24/02* (2013.01)

(58) Field of Classification Search
CPC . H04J 11/0053; H04J 11/0023; H04J 11/0026; H04J 11/004; H04L 5/0023; H04L 5/0035; H04L 5/0053; H04L 5/0094; H04L 27/2691

USPC .......................................................... 370/329
See application file for complete search history.

(56) References Cited

U.S. PATENT DOCUMENTS

| | | | | |
|---|---|---|---|---|
| 2010/0173659 A1* | 7/2010 | Shin | ..................... | H04B 7/0452 455/500 |
| 2011/0194511 A1* | 8/2011 | Chen | ................... | H04W 72/121 370/329 |
| 2013/0039272 A1* | 2/2013 | Chen | ................... | H04W 76/045 370/328 |
| 2013/0324117 A1* | 12/2013 | Kim | ..................... | H04L 1/0047 455/434 |
| 2014/0198747 A1* | 7/2014 | Ouchi | ................... | H04L 5/0053 370/329 |
| 2015/0382371 A1* | 12/2015 | Liu | ........................ | H04B 7/024 370/329 |

(Continued)

*Primary Examiner* — Un C Cho
*Assistant Examiner* — Shah Rahman
(74) *Attorney, Agent, or Firm* — Morgan, Lewis & Bockius LLP

(57) ABSTRACT

A method for receiving, by a UE, information for interference cancellation, the method includes receiving assistance control information for removing interference data from a neighboring eNB; and receiving primary control information indicating the interference data using the assistance control information, the assistance control information includes at least one of control channel element (CCE) indices, an aggregation level and a downlink control information (DCI) format of a control channel on which the primary control information is transmitted and cyclic redundancy check (CRC) bits for the control channel, the assistance control information includes sub-assistance control information on neighboring UEs simultaneously scheduled by the neighboring eNB.

16 Claims, 14 Drawing Sheets

(56) References Cited

U.S. PATENT DOCUMENTS

2016/0081093 A1\* 3/2016 Hugl ...................... H04J 11/005
  370/329

\* cited by examiner

FIG. 9

| ceil(log₂(N_CCE)) bits | Agg. level (2bits) | DCI format | CRC_NAIC (4bits) |

METHOD AND APPARATUS FOR TRANSMITTING INTERFERENCE INFORMATION

DETAILED DESCRIPTION OF THE INVENTION

This application claims the benefit of U.S. Provisional Application No. 61/858,580, filed on Jul. 25, 2013, which is hereby incorporated by reference as if fully set forth herein.

BACKGROUND OF THE INVENTION

Field of the Invention

The present invention relates to a wireless communication system, and more particularly, to a method and apparatus for transmitting and receiving information for interference cancellation.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed a method and apparatus for transmitting and receiving interference cancellation information that substantially obviates one or more problems due to limitations and disadvantages of the related art.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, provided is a method for receiving, by a UE, information for interference cancellation, the method comprising: receiving assistance control information for removing interference data from a neighboring eNB; and receiving primary control information indicating the interference data using the assistance control information, the assistance control information includes at least one of control channel element (CCE) indices, an aggregation level and a downlink control information (DCI) format of a control channel on which the primary control information is transmitted and cyclic redundancy check (CRC) bits for the control channel, the assistance control information includes sub-assistance control information on neighboring UEs simultaneously scheduled by the neighboring eNB.

Preferably, the method may further include receiving the assistance control information in a search space determined based on a dedicated RNTI for the assistance control information.

Preferably, the dedicated RNTI may be received through a higher layer signal.

Preferably, the assistance control information may be received at the CCE index following the last CCE index at which control information indicating data for the UE is received.

Preferably, the method may further include detecting the interference data from the neighboring eNB using the received primary control information; and removing the detected interference data from total received data.

Preferably, the method may further include receiving information on an aggregation level for the assistance control information through a higher layer signal, the aggregation level of an assistance control channel on which the assistance control information may be transmitted is limited to part of all aggregation levels available for control channels.

Preferably, when the assistance control information may include a plurality of sub-assistance control informations respectively configured for each of a plurality of neighboring UEs simultaneously scheduled by the neighboring eNB, a flag bit field for indicating whether a subsequent sub-assistance control information follows may be added to each of back end of the plurality of the sub-assistance control information.

Preferably, the assistance control information may be included in control information indicating data for the UE and received from a serving eNB of the UE.

Preferably, the assistance control information may be received from the neighboring eNB.

Preferably, when the assistance control information may be received on an enhanced physical downlink control channel (EPDCCH), an EPDCCH physical resource block (PRB) set for the assistance control information may be configured independently of an EPDCCH PRB set for control information indicating data for the UE.

In another aspect of the present invention, provided is a method for transmitting, by an eNB, information for interference cancellation of a UE (referred to as a neighboring UE) served by a neighboring eNB, the method comprising: transmitting primary control information indicating data for at least one serving UE; and transmitting assistance control information for interference cancellation, the assistance control information includes at least one of CCE indices, an aggregation level and a DCI format of a control channel on which the primary control information is transmitted and CRC bits for the control channel, the assistance control information includes sub-assistance control information on neighboring UEs simultaneously scheduled by the eNB.

Preferably, the method may further include transmitting the assistance control information in a search space determined based on a dedicated RNTI for the assistance control information.

Preferably, the assistance control information may be transmitted at the CCE index following the last CCE index at which control information indicating data for the UE is received.

Preferably, the method may further include transmitting information on an aggregation level for the assistance control information, the aggregation level of an assistance control channel on which the assistance control information may be transmitted is limited to part of all aggregation levels available for control channels.

Preferably, when the assistance control information includes a plurality of sub-assistance control informations respectively configured for each of a plurality of neighboring UEs simultaneously scheduled by the eNB, a flag bit field for indicating whether a subsequent sub-assistance control information follows may be added to each of back end of the plurality of the sub-assistance control information.

Preferably, when the assistance control information is transmitted on an EPDCCH, an EPDCCH PRB set for the assistance control information may be configured independently of an EPDCCH PRB set for control information indicating data for the UE.

In another aspect of the present invention, provided is a user equipment (UE) configured to receive information for interference cancellation, comprising: a radio frequency (RF) unit; and a processor, the processor is configured to receive assistance control information for removing interference data from a neighboring eNB and to receive primary control information indicating the interference data using the assistance control information, the assistance control information includes at least one of CCE indices, an aggregation level and a DCI format of a control channel on which the primary control information is transmitted and CRC bits for the control channel, the assistance control information includes sub-assistance control information on neighboring UEs simultaneously scheduled by the neighboring eNB.

In another aspect of the present invention, provided is an enhanced node B (eNB0 configured to transmit information for interference cancellation of a UE (referred to as a neighboring UE) served by a neighboring eNB, comprising: an RF unit; and a processor, the processor is configured to transmit primary control information indicating data for at least one serving UE and to transmit assistance control information for interference cancellation, the assistance control information includes at least one of CCE indices, an aggregation level and a DCI format of a control channel on which the primary control information is transmitted and CRC bits regarding the control channel, the assistance control information includes sub-assistance control information about neighboring UEs simultaneously scheduled by the eNB.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 shows an example of assistance control information according to one embodiment of the present invention;

DETAILED DESCRIPTION OF THE INVENTION

Figure 1:
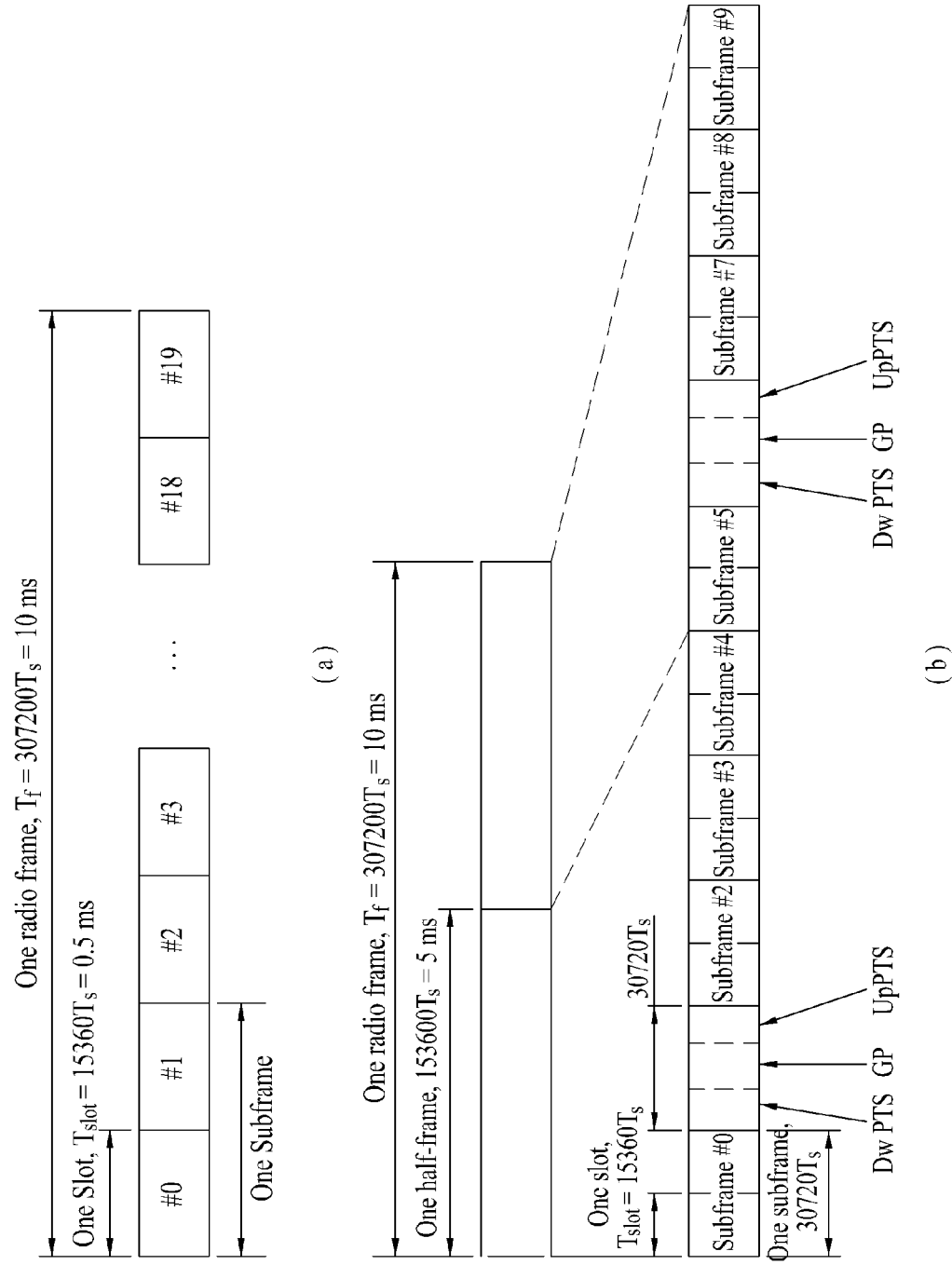
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
| --- | --- | --- | --- | --- | --- | --- |
| | DwPTS | UpPTS Normal cyclic prefix in uplink | UpPTS Extended cyclic prefix in uplink | DwPTS | UpPTS Normal cyclic prefix in uplink | UpPTS Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
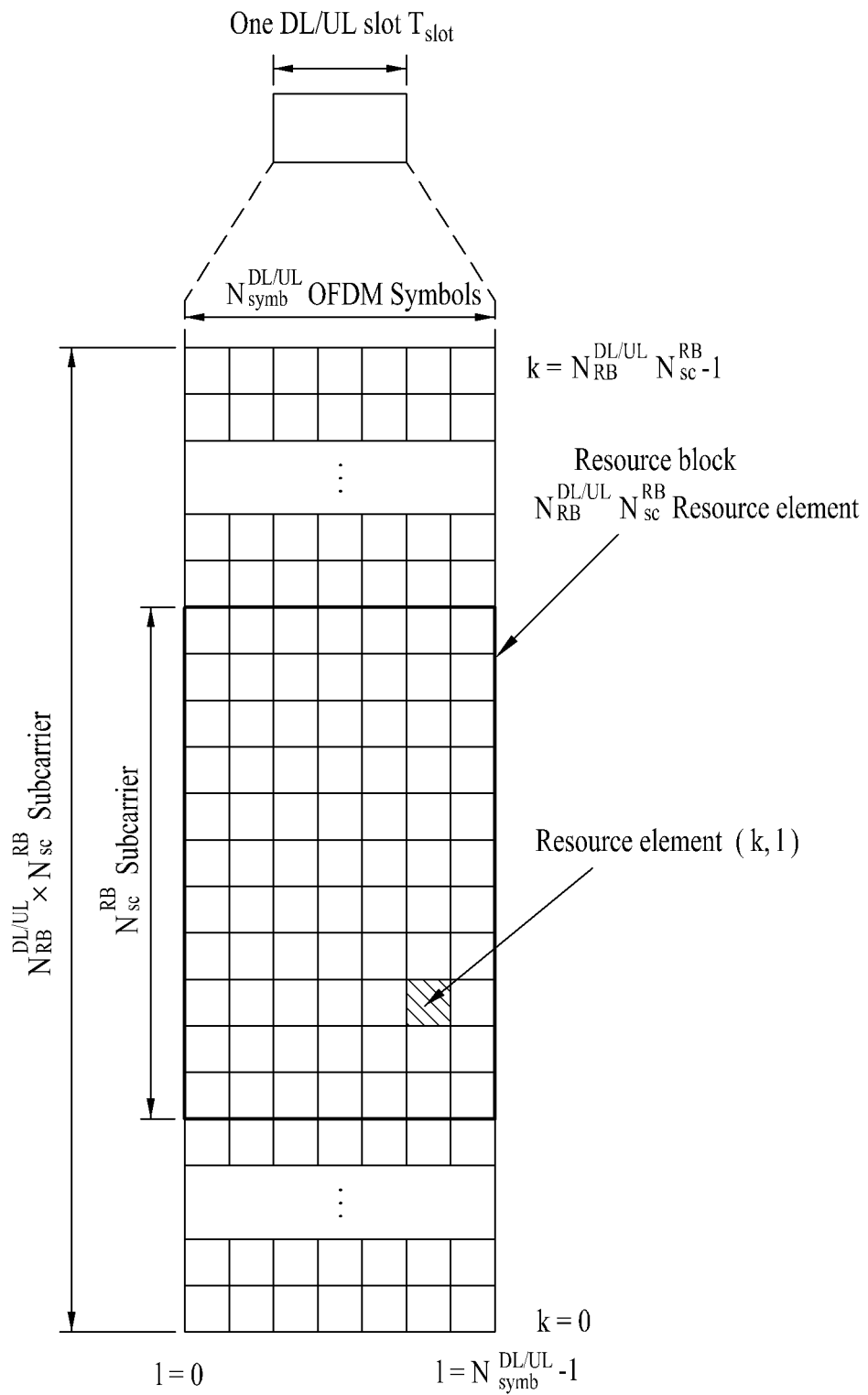
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
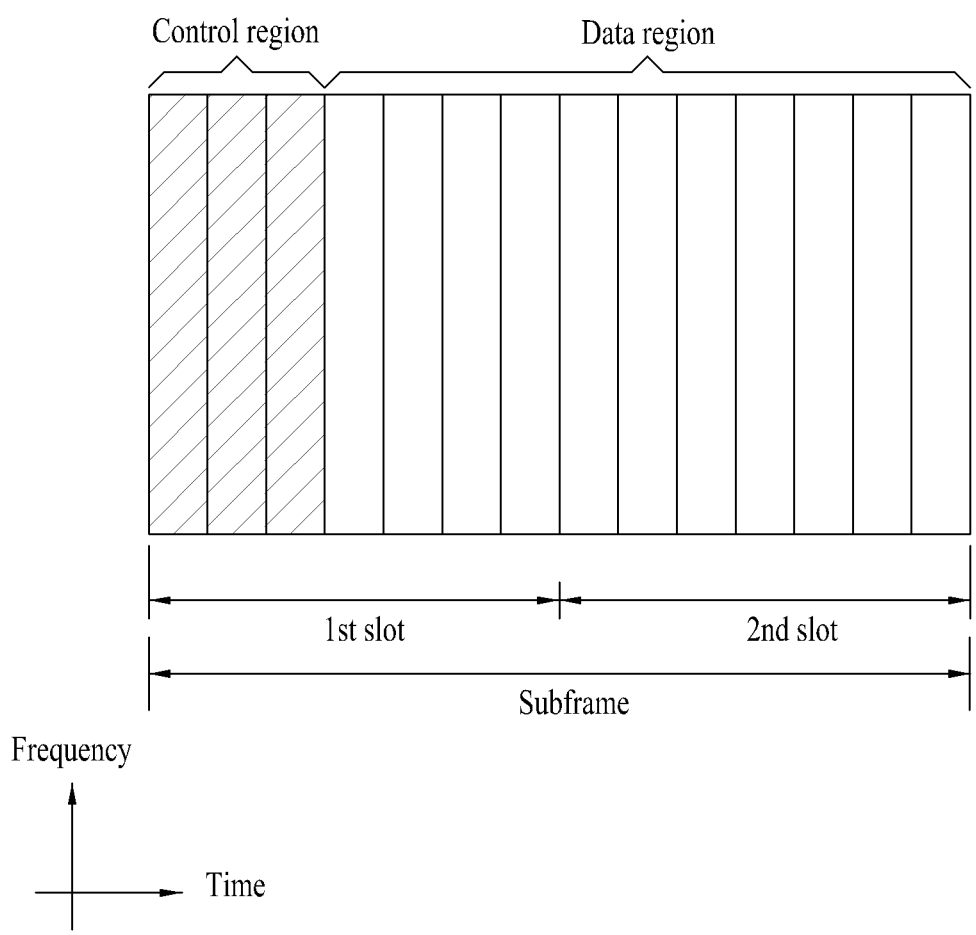
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
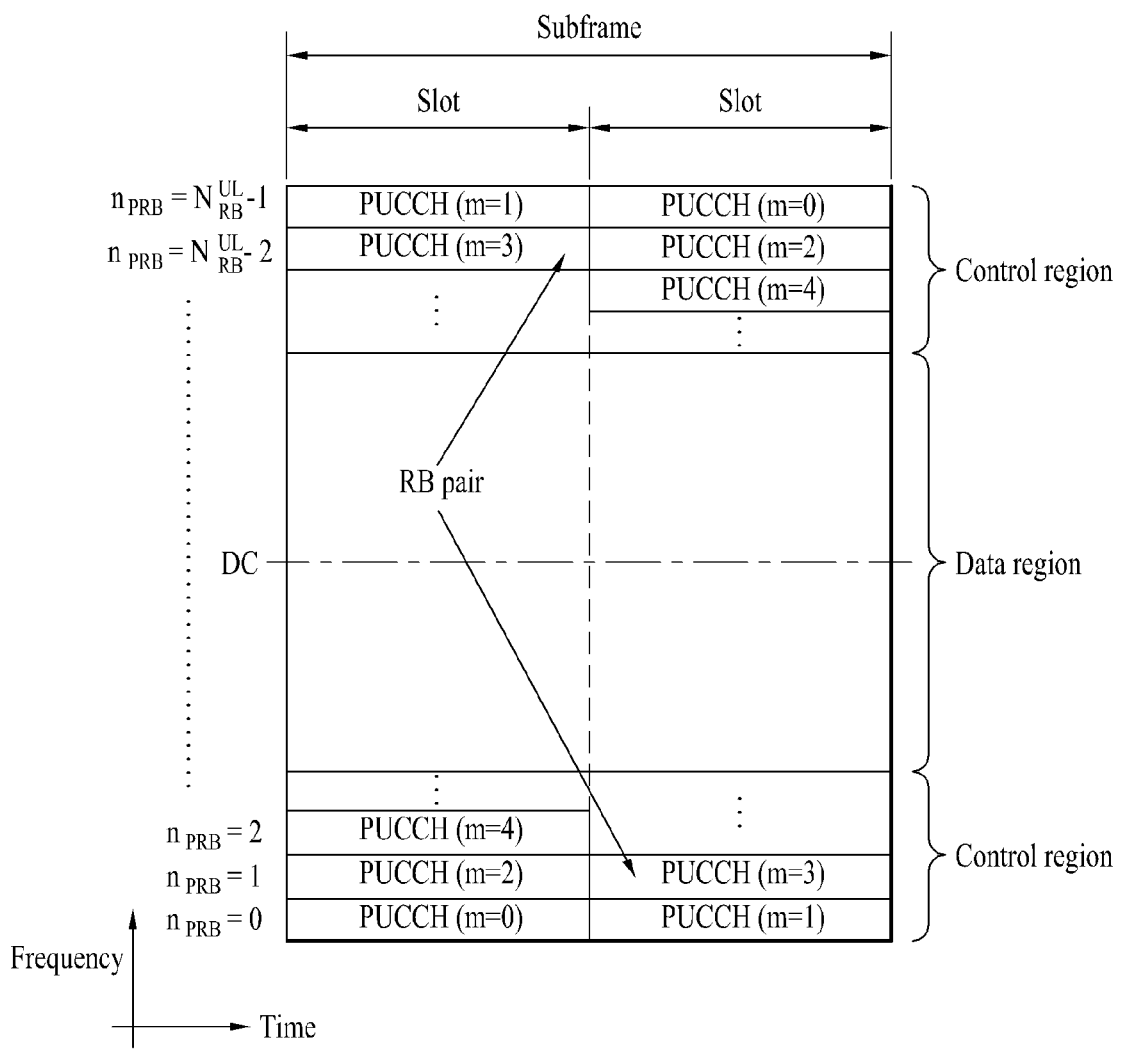
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In an enhanced wireless communication system such as LTE Rel-12, a network based IC technique or a network assisted IC (NAIC) technique for eliminating interference data from a neighboring cell or transmission point based on network assistance is under discussion. When a UE performs NAIC, the UE can use DCI about interference data transmitted in a data region thereof. For example, if the UE knows information about a resource region in which the interference data is transmitted within the data region and modulation information, then the UE can detect the interference data on a symbol-by-symbol basis and eliminate interference more correctly. In addition, when a UE that supports NAIC has sufficient hardware performance and performs codeword detection for interference data from a neighboring cell, DCI about the neighboring cell interference data is necessary for codeword detection. Accordingly, the UE supporting NAIC better detects the DCI about the neighboring cell interference data.

In LTE, however, a search space (SS) in which specific DCI is detected and cyclic redundancy check (CRC) bits for checking a detection error with respect to the DCI are determined by the ID of a UE that will receive data using the DCI, that is, an RNTI. That is, the UE can receive DCI format 1A for fallback operation and a DCI format (e.g. DCI format 2C) for supporting MIMO according to a transmission mode (TM) set therefor and perform blind decoding (BD) on the DCI corresponding to the two DCI formats. An SS for performing BD can be inferred as follows through an RNTI value applied to the DCI and the aggregation level (AL) of the DCI.

In LTE, a control region of each serving cell is composed of $N_{CCE,k}$ CCEs in a k-th subframe and a UE needs to monitor a PDCCH candidate set on one or more activated serving cells as set by higher layer signaling for control information. Here, monitoring refers to attempts to decode PDCCHs in the PDCCH candidate set according to all monitored DCI formats. When the aggregation level is L, CCEs corresponding to PDCCH candidate m in a search space for each serving cell in which PDCCHs are monitored can be defined as follows.

$$L\{(Y_k+m') \bmod \lfloor N_{CCE,k}/L \rfloor\}+i \quad \text{[Expression 1]}$$

$Y_k$ is defined by the following mathematical expression, i=0, . . . , L−1 and m=m' for a common search space. When carrier aggregation is set for the UE for a UE-specific search space, m'=m+M$^{(L)}$·n$_{CI}$ wherein n$_{CI}$ is a carrier indicator field value. When carrier aggregation is not set for the UE, m'=m, m=0, . . . , M$^{(L)}$−1 where M$^{(L)}$ denotes the number of PDCCH candidates to be monitored in a given search space.

For the common search space, $Y_k$ is set to 9 for aggregation levels 4 and 8. For the UE-specific search space, $Y_k$ is defined as follows.

$$Y_k=(A \cdot Y_{k-1}) \bmod D \quad \text{[Expression 2]}$$

Here, $Y_{-1}=n_{RNTI} \neq 0$, A=39827, D=65537 and k=$\lfloor n_s/2 \rfloor$ where $n_s$ denotes a slot number in a radio frame.

To check a transmission error with respect to DCI transmission, a 16-bit CRC is attached to DCI and scrambled with an RNTI corresponding to a UE ID and the DCI is transmitted. The corresponding UE can detect the DCI by descrambling the DCI with the RNTI thereof. Due to the aforementioned characteristics of LTE(-A), when DCI about interference data from a neighboring cell is detected without having information about the RNTI of a UE scheduled in the neighboring cell, the number of BD operations may remarkably increase since an SS cannot be recognized. In addition, when neighboring cell DCI is detected without error checking according to CRC bits, reliability of the DCI may be deteriorated.

First Embodiment

Assisting Downlink Control Information (A-DCI)

To solve the aforementioned problem, RNTIs of UEs scheduled in a neighboring cell is signaled to a UE that supports NAIC. However, the scheduled UEs may dynamically change within a relatively short time. Here, if N arbitrary UEs are scheduled, dynamic signaling of a maximum of N*16 bits of RNTI related information to the UE supporting NAIC every time may cause excessive overhead, deteriorating system efficiency. To solve this, the present invention proposes a method for transmitting A-DCI including information used for a UE supporting NAIC to detect currently transmitted specific DCI in a neighboring TP. For example, the A-DCI may include information on a CCE index at which the specific DCI is started, aggregation level, DCI format, a CRC value regarding part or all of the DCI, RS type, etc. The RS type is not necessary for DCI detection and is necessary for the UE supporting NAIC to perform demodulation after DCI detection. That is, the A-DCI contains information used to detect specific DCI and to demodulate data corresponding to the DCI rather than directly signaling RNTI information. The UE supporting NAIC may detect A-DCI transmitted from a neighboring cell to recognize the position of DCI including information about a UE scheduled in the neighboring cell and, simultaneously, receive information (e.g. RS type) that is not included in the DCI.

Figure 5:
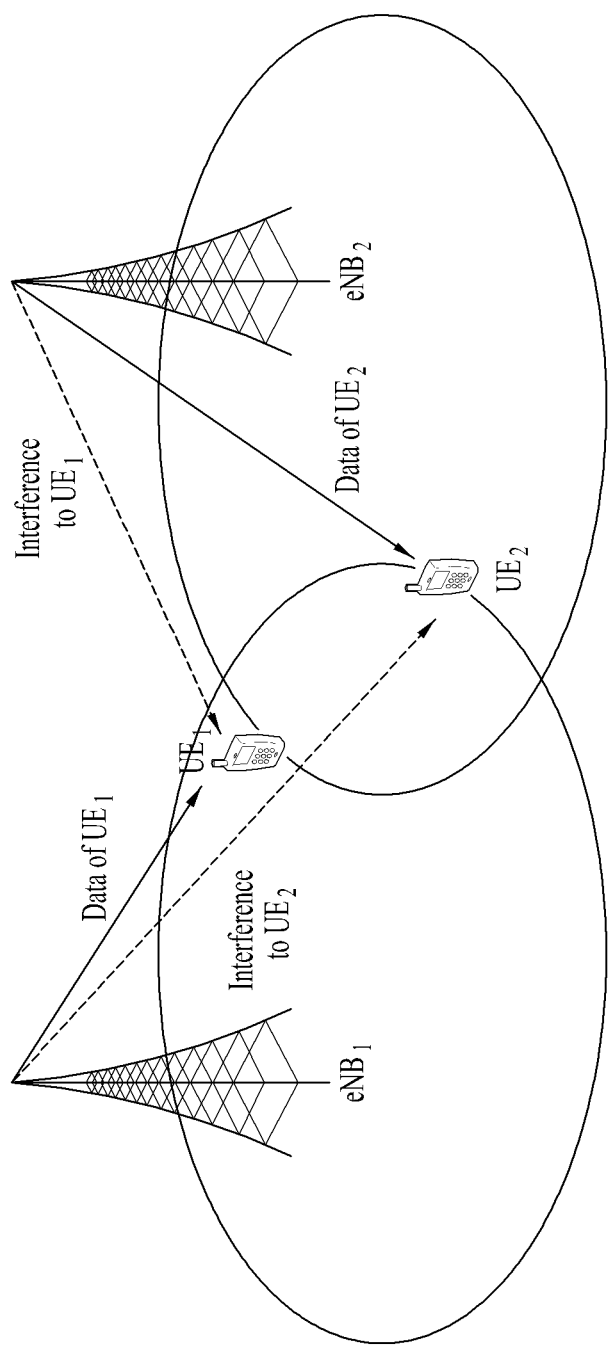
FIG. 5 shows inter-cell or inter-transmission point interference according to one embodiment of the present invention.

FIG. 5 shows an environment in which UE$_1$ served by eNB$_1$ and UE$_2$ served by eNB$_2$ are present, data transmitted from eNB$_1$ to UE$_1$ applies interference to UE$_2$ and, at the same time, data transmitted from eNB$_2$ to UE$_2$ applies interference to UE$_1$ in an LTE(-A) system. In FIG. 5, when UE$_1$ or UE$_2$ performs NAIC, the influence of interference can be mitigated if interference data is successfully removed from received signals after attempted demodulation or decoding of neighboring cell data. In the specification, it is assumed that UE$_1$ performs NAIC and data regarding UE$_2$ is applied to UE$_1$ as interference in FIG. 5 for convenience of description.

According to the present invention, A-DCI is provided to UE$_1$ such that UE$_1$ can detect or receive DCI about data (i.e. interference data from the viewpoint of UE$_1$) transmitted from eNB$_2$ to UE$_2$. The aforementioned information included in the A-DCI is exemplary and other or more information may be added to the A-DCI or replaced by the information included in the A-DCI.

With regard to NAIC, information included in the A-DCI can be used for a UE (NAIC UE; UE$_1$ of FIG. 5) that performs NAIC to demodulate or decode neighboring cell interference data. Since NAIC is effective to eliminate an instantaneous interference signal, information used to demodulate or decode neighboring cell data is preferably dynamically signaled to the NAIC UE. In addition, the A-DCI is characterized in that the A-DCI is transmitted at a CCE index which is predetermined between the UE and a neighboring cell such that a NAIC UE of the neighboring cell can detect the A-DCI at the predetermined CCE index.

However, some information included in the A-DCI is included in DCI transmitted from the neighboring cell for corresponding data and dynamically transmitted. Accordingly, it is desirable that the NAIC UE make the best use of the DCI about neighboring cell interference data for resource utilization efficiency.

The A-DCI includes a CCE index at which specific DCI scheduled in a neighboring cell is transmitted as a tag regarding the specific DCI and may directly signal the CCE index of the specific DCI. For example, when the bandwidth is 10 MHz (e.g. 50 RBs), the number of CRS ports is 4 and a PDCCH symbol length corresponds to 3 OFDM symbols, about 40 CCEs can be present. The 40 CCEs may be represented by 5 bits, which is less than a 16-bit RNTI. Accordingly, when the NAIC UE has detected the A-DCI, the NAIC UE can detect DCI about neighboring cell interference data, which is indicated by the A-DCI, by performing only BD at four aggregation levels (e.g. 1, 2, 4 and 8) since the NAIC UE can check a CCE index corresponding to the transmission starting point of the specific DCI indicated by the A-DCI. In addition, additional 2-bit information about the AL may be included in the A-DCI. In this case, the NAIC UE can directly detect the DIC about the neighboring cell interference data. That is, the DCI can be detected through one-time detection.

Figure 6:
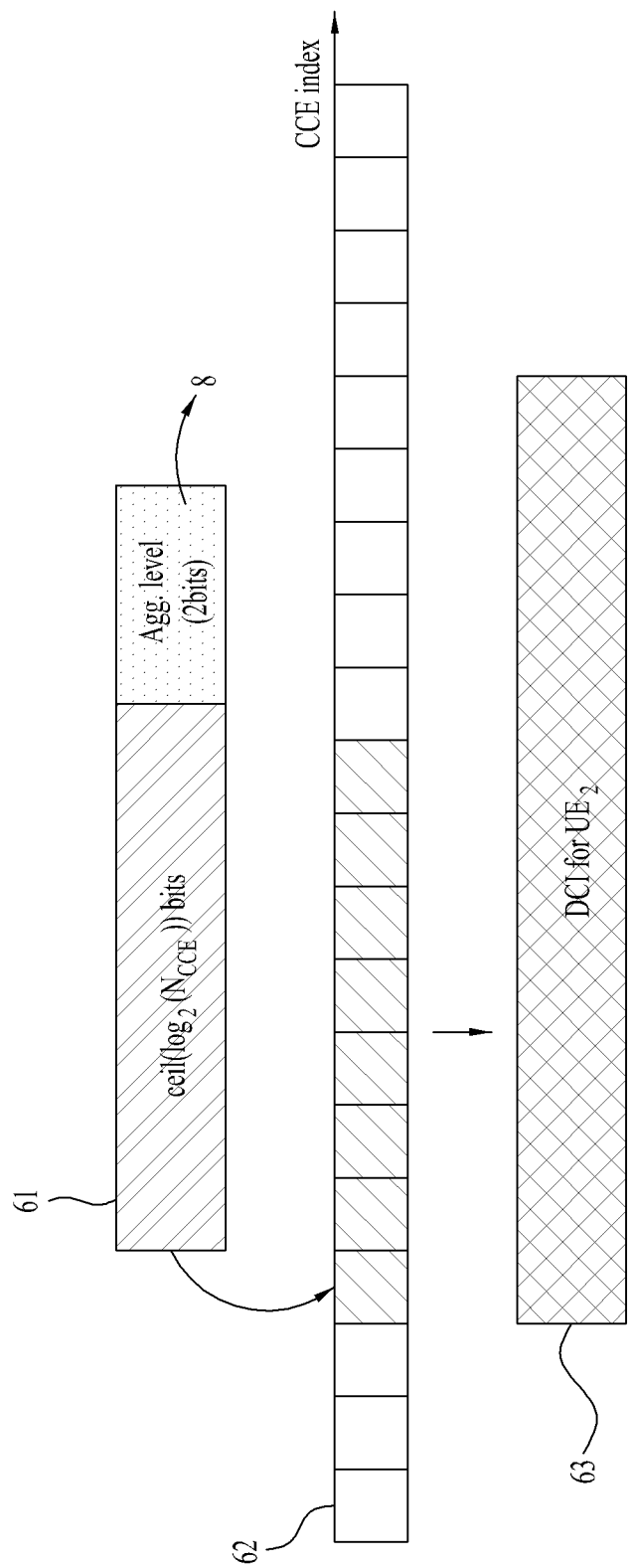
FIG. 6 shows an example of assistance control information and operation thereof according to one embodiment of the present invention.

FIG. 6 illustrates A-DCI and an example of detecting specific DCI using the A-DCI according to an embodiment of the present invention. The A-DCI 61 may include a starting CCE index to which the specific DCI is mapped and an aggregation level (AL). It is assumed that AL=8. Referring to FIG. 5, the A-DCI can be transmitted by eNB$_2$. Upon reception and successful detection of the A-DCI, UE$_1$ can obtain the specific DCI in a resource region 62 corresponding to the CCE index in a corresponding subframe 63. The CCE index is represented by ceil(log$_2$ (N$_{CCE}$)) bits, which means that ceil(log$_2$ (N$_{CCE}$)) bits are necessary to represent a total number of CCEs.

Figure 7:
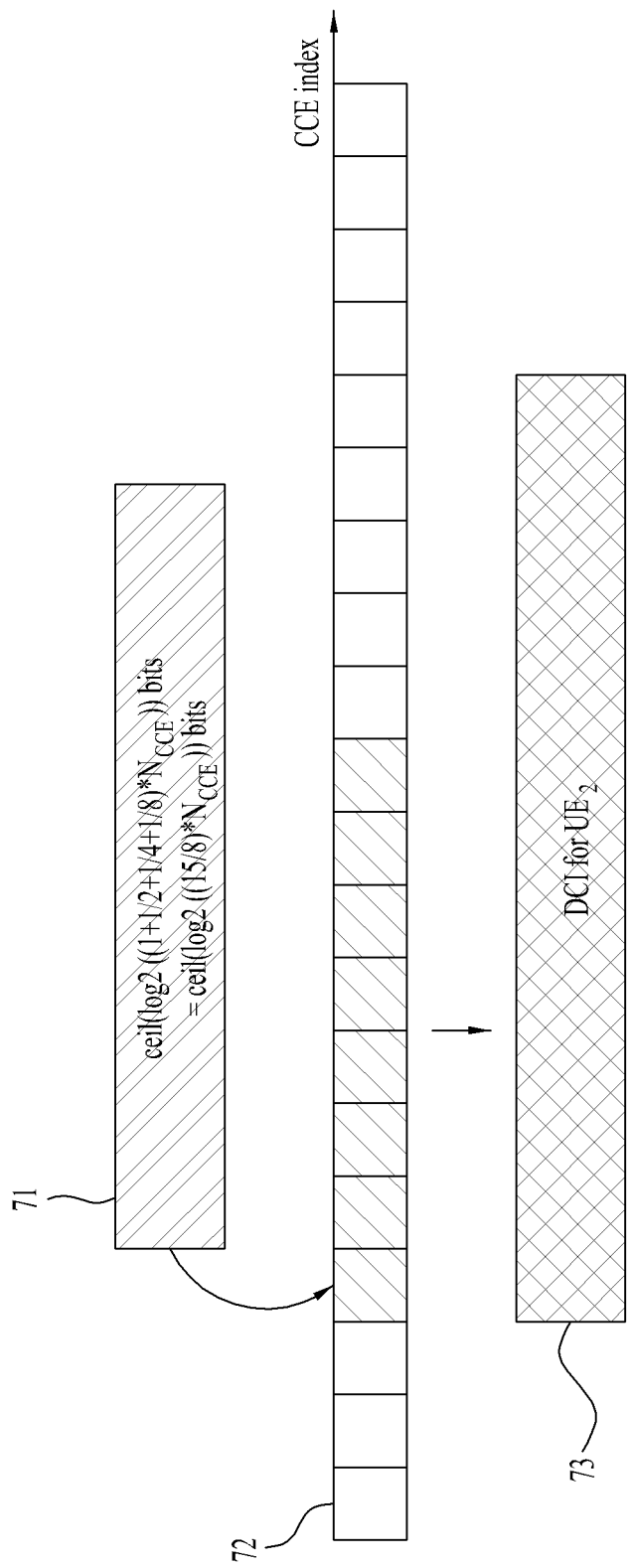
FIG. 7 shows an example of assistance control information and operation thereof according to one embodiment of the present invention.

In LTE, when AL=N (N=1, 2, 4, 8), the starting CCE index of a PDCCH including DCI is set to a multiple of N. If there are CCE indexes 0 to 40, then the starting CCE index is set to 0, 1, 2, 3, . . . when AL is 1 and set to 0, 2, 4, 6, . . . when AL is 2. In FIG. 6, it is possible to represent starting CCE indexes available per AL as a single bit field rather than additionally defining a bit field for AL. When the total number of CCEs is $N_{CCE}$, the number of starting points available when AL=1 can be represented as $N_{CCE}$, the number of starting points available when AL=2 can be represented as $N_{CCE}/2$, the number of starting points available when AL=4 can be represented as $N_{CCE}/4$ and the number of starting points available when AL=8 can be represented as $N_{CCE}/8$. Accordingly, the number of all available starting points can be represented as ceil(log $2\{(1+\frac{1}{2}+\frac{1}{4}+\frac{1}{8})*N_{CCE}\}$) as shown in FIGS. 7. 71 and 73 in FIG. 7 respectively correspond to 61 and 63 in FIG. 6 except the method for representing the starting CCE index.

Figure 8:
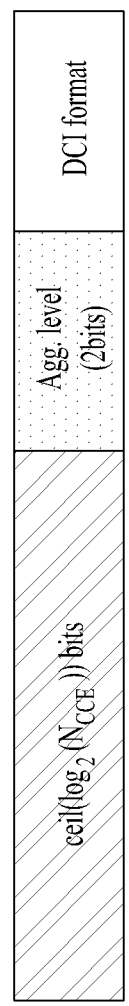
FIG. 8 shows an example of assistance control information according to one embodiment of the present invention.

Even when the NAIC UE has detected DCI about data transmitted in a neighboring cell using the A-DCI, the NAIC UE cannot check information about a transmission mode (TM) corresponding to a data region indicated by the DCI because the information is not included in the DCI. In addition, the DCI format of the neighboring cell data may be dynamically changed even in the same TM. For example, when TM9 is set for a specific UE in an LTE system according to an embodiment of the present invention, the UE uses a DM-RS defined in LTE as an RS for demodulation when operating in DCI format 2C which supports MIMO, whereas the UE uses a CRS defined in LTE as the demodulation RS when operating in DCI format 1A according to fallback operation. Accordingly, it is desirable to dynamically provide information about DCI format to the NAIC UE to recognize the length of DCI about interference data from the neighboring cell and the type of demodulation RS. Therefore, the present invention provides a method of including 1-bit information about DCI format in the A-DCI. FIG. 8 illustrates the A-DCI obtained by adding the bit field for DCI format to the DCI structure shown in FIG. 6.

A description will be given of a method through which a neighboring cell transmits, to an NAIC UE, A-DCI including CRC bits (i.e. $CRC_{NAIC}$) regarding part or all of specific DCI about data scheduled in the neighboring cell according to an embodiment of the present invention. An SS related function from among functions of RNTI can be supported by configuring A-DCI including the start CCE index or AL of DCI corresponding to neighboring cell interference data, as shown in FIG. 6. However, the A-DCI shown in FIG. 6 cannot support the error detection function according to CRC bits, one of the functions of RNTI. Accordingly, the present invention provides a method of including $CRC_{NAIC}$ regarding specific DCI, which is indicated by the A-DCI, in the A-DCI. Here, $CRC_{NAIC}$ can be determined as a value smaller than 16 CRC bits provided for UEs served in LTE systems since $CRC_{NAIC}$ is provided to support NAIC. $CRC_{NAIC}$ provided to support NAIC may be a CRC for part of the specific DCI indicated by the A-DCI rather than a CRC for the whole DCI. FIG. 9 illustrates exemplary A-DCI including $CRC_{NAIC}$ (e.g. 4 bits).

Figure 10:
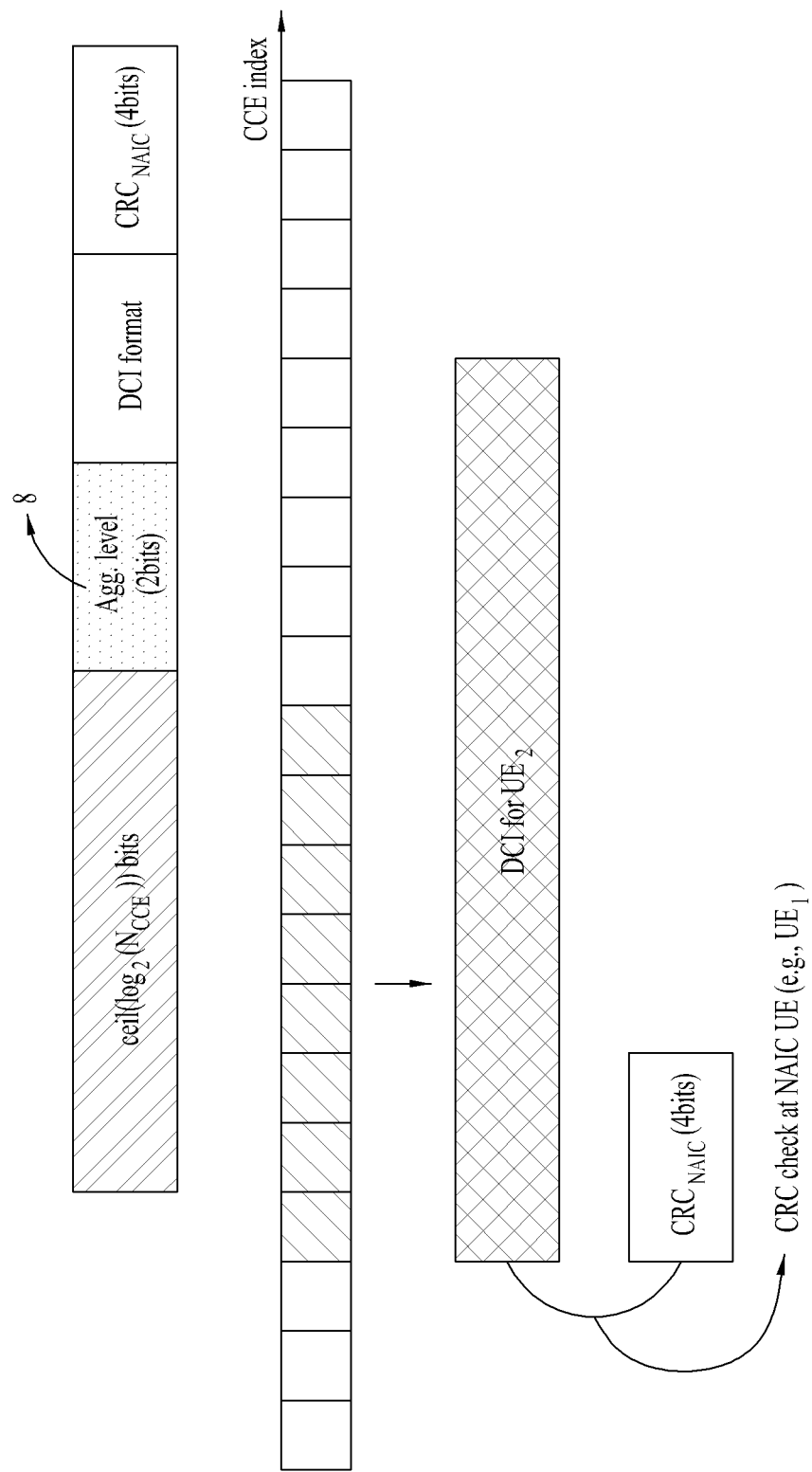
FIG. 10 shows an example of assistance control information and operation thereof according to one embodiment of the present invention.

More specifically, referring to FIGS. 5 and 10, $UE_1$ may detect DCI about data of $UE_2$ using A-DCI transmitted from $eNB_2$. In addition, $UE_1$ may perform CRC error checking, as shown in FIG. 10, using $CRC_{NAIC}$ included in the A-DCI. Here, $CRC_{NAIC}$ may be applied to only part of the DCI. For example, if $UE_1$ only demodulates the data of $UE_2$, $CRC_{NAIC}$ can be applied to a resource region and MCS information only.

Second Embodiment

Method of Including A-DCI in DCI and Transmitting the Same

A description will be given of a method for configuring A-DCI by adding, to DCI, information about CCE indexes corresponding to CCEs through which DCI about data scheduled in a neighboring cell is transmitted, aggregation level, DCI format and CRC bits regarding part or all of DCI according to an embodiment of the present invention.

In FIG. 5, an optical cable is connected between $eNB_1$ and $eNB_2$ such that $eNB_1$ and $eNB_2$ can freely share scheduling information. Here, $eNB_1$ can be directly aware of information about interference data that affects $UE_1$ through scheduling information of $eNB_2$. In this case, $eNB_1$ can add specific DCI about the interference data to DCI for $UE_1$ and transmit the DCI. That is, while the A-DCI is transmitted by $UE_2$ in the above description, the A-DCI can be transmitted by $UE_1$ in the present embodiment. Accordingly, the NAIC UE can detect DCI for data thereof and, at the same time, check the DCI about the interference data affecting the UE according to the above-described operation according to the present invention.

Third Embodiment

Method of Configuring A-DCI Independently of DCI and Transmitting the Same

A description will be given of a method for independently configuring A-DCI including information about CCE indexes corresponding to CCEs through which DCI about data (i.e. interference data) scheduled in a neighboring cell is transmitted, aggregation level, DCI format and CRC bits regarding part or all of DCI and determining CCE positions in which the A-DCI is transmitted based on CCE positions corresponding to DCI transmitted for data reception of the NAIC UE according to an embodiment of the present invention. Here, the DCI transmitted for data reception of the NAIC UE refers to DCI about data scheduled to be received by the NAIC UE. In FIG. 5, an optical cable is connected between $eNB_1$ and $eNB_2$ such that $eNB_1$ and $eNB_2$ can freely share scheduling information. Here, information included in the A-DCI may be added to the DCI indicating data for $UE_1$ and transmitted. However, the information included in the A-DCI is not essential information for data reception (i.e. the information is assistance data for interference cancellation) and thus it is necessary to discriminate the information from DCI. Therefore, in one embodiment of the present invention, the A-DCI is configured independently of DCI and CCE positions in which the A-DCI is transmitted are determined to belong to CCE positions in which DCI for the NAIC UE that needs to receive the A-DCI is transmitted. For example, the A-DCI can be transmitted at the CCE index following the final CCE index in CCE positions in which the DCI regarding $UE_1$ is transmitted. Here, $UE_1$ may detect the DCI thereof and then attempt to detect the A-DCI at the CCE index following the final CCE index of the DCI. An additional RNTI may not be applied to the CRC for the A-DCI. In addition, a 1-bit flag may be added to the A-DCI to indicate whether another A-DCI is present at the CCE index following the A-DCI.

Fourth Embodiment

Method of Using an Additional RNTI for CRC Bit Scrambling of A-DCI

A description will be given of a method of applying an RNTI value previously provided to the NAIC UE through higher layer signaling to a CRC for error checking of the A-DCI in configuration of the independent A-DCI such that the SS of the A-DCI is determined by the RNTI value provided through higher layer signaling according to an embodiment of the present invention. The A-DCI proposed by the present invention is DCI transmitted from a neighboring cell to assist the NAIC UE in cancelling interference from the neighboring cell. Accordingly, the NAIC UE needs to previously know an SS in which the A-DCI is transmitted in order to detect the A-DCI. In LTE(-A), an SS is determined by a function of RNTI. Accordingly, in one embodiment of the present invention, an RNTI value applied to the A-DCI may be pre-signaled to the NAIC UE through higher layer signaling and the NAIC UE may attempt to detect the A-DCI using the RNTI value. The RNTI may be present per A-DCI and a set of RNTIs (e.g. RNTI1, RNTI2, RNTI3, etc.) used for the A-DCI may be set for the NAIC UE.

Fifth Embodiment

Limitation of AL for A-DCI

A description will be given of a method for limiting the aggregation level of the A-DCI and signaling information about the limited aggregation level to the NAIC UE according to an embodiment of the present invention. The A-DCI may be DCI for a plurality of NAIC UEs and the aggregation level thereof is preferably limited to values which are advantageous in terms of coverage and noise rather than being set to various values. For example, the aggregation level of the A-DCI can be set to two values, 4 and 8, or set to the largest value, 8. The method according to the present embodiment can efficiently support NAIC UEs and can reduce the number of BD operations performed on the A-DCI. Accordingly, in one embodiment of the present invention, the aggregation level of the A-DCI may be set to a set of values, which is smaller than the set of aggregation level values of the conventional DCI, and information about the set aggregation level is signaled to the NAIC UEs through higher layer signaling, for example, RRC signaling.

Sixth Embodiment

Method for Transmitting Plural Pieces of A-DCI

A description will be given of a method for adding a 1-bit flag to multiple pieces of A-DCI transmitted by an eNB that transmits interference data to indicate presence or absence of A-DCI corresponding to an RNTI value following the RNTI value corresponding to the current A-DCI when eNBs, which transmit interference data, send a plurality of pieces of A-DCI, RNTIs respectively corresponding to the pieces of A-DCI are present and a set of sequential RNTIs is configured for an NAIC UE according to an embodiment of the present invention.

Figure 11:
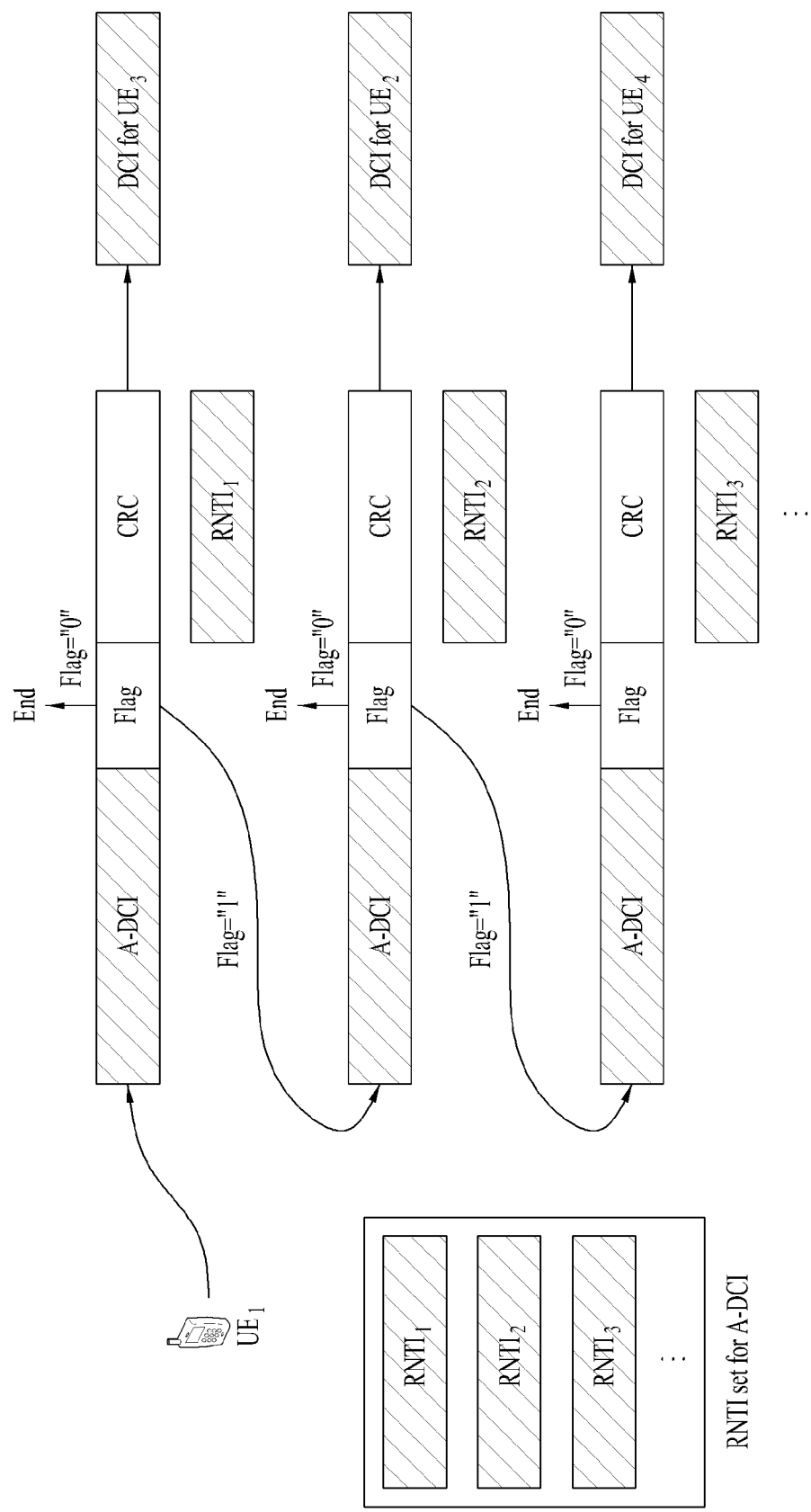
FIG. 11 shows an example of assistance control information and operation thereof according to one embodiment of the present invention.

For example, it is assumed that three UEs (e.g. $UE_2$, $UE_3$ and $UE_4$) are scheduled for $eNB_2$ and three pieces of A-DCI (e.g. $A-DCI_1$, $A-DCI_2$ and $A-DCI_3$) are transmitted corresponding to the three UEs in FIG. 5. In addition, it is assumed that an RNTI set including $RNTI_1$, $RNTI_2$ and $RNTI_3$ in order, which correspond to the three pieces of A-DCI, is provided to $UE_1$ that supports NAIC. Then $UE_1$ can detect $A-DCI_1$ in an SS corresponding to $RNTI_1$ and obtain DCI about $UE_3$ using $A-DCI_1$, as shown in FIG. 11. If the 1-bit flag added to $A-DCI_1$ indicates 1, this means that $A-DCI_2$ corresponding to $RNTI_2$ is present, and thus $UE_1$ can obtain DCI about $UE_2$ by detecting $A-DCI_2$, as shown in FIG. 11. In this manner, $UE_1$ may continue detection of A-DCI until the flag of detected A-DCI indicates 0. Here, next A-DCI detection need not be indicated by flag bit '1' and may be indicated by flag bit "0" according to configuration.

Seventh Embodiment

A-DCI Including Information about Plural Pieces of DCI

Figure 12:
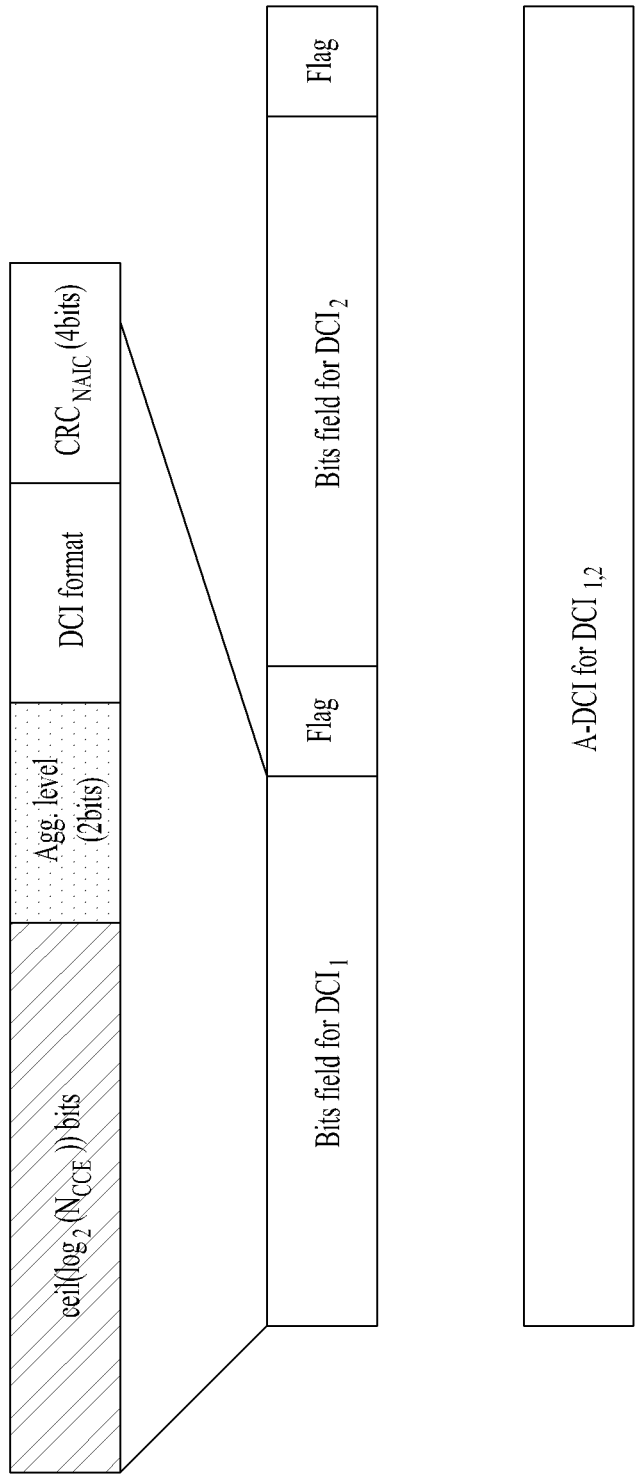
FIG. 12 shows an example of assistance control information and operation thereof according to one embodiment of the present invention.

A description will be given of an A-DCI configuration method for sequentially connecting information (referred to as sub-A-DCI), such as information about CCE indexes at which DCI about data (e.g. interference data) scheduled in a neighboring cell is transmitted, aggregation level, DCI format and CRC bits regarding part or all of the DCI, and providing a flag bit after a bit field with respect to each piece of the sub-A-DCI to determine validity of the corresponding sub-A-DCI according to an embodiment of the present invention. If the configuration of the A-DCI shown in FIGS. 6 to 9 includes only information on a single piece of DCI, then resource efficiency may be poor since the payload size of the A-DCI is small. Accordingly, an embodiment of the present invention considers a method of including M pieces of sub-A-DCI about M pieces of DCI in a single piece of A-DCI. Simply, pieces of sub-A-DCI for respective pieces of DCI may be sequentially connected to configure a single A-DCI. In this case, however, validity of some information values included in the A-DCI may be ambiguous when the number of scheduled UEs is less than M. Accordingly, an embodiment of the present invention proposes a method of adding a 1-bit flag immediately after the bit field of sub-A-DCI regarding each piece of DCI to determine whether the next A-DCI is valid. FIG. 12 illustrates a case in which M=2. In FIG. 12, a bit flag following the bit field regarding $DCI_2$ is used to indicate whether the next sub-A-DCI is present in FIG. 12.

Eighth Embodiment

Method for Transmitting A-DCI on an EPDCCH

A description will be given of a method for configuring an EPDCCH PRB set independent of an EPDCCH PRB set for the conventional DCI for A-DCI for a UE that detects the A-DCI using an E-PDCCH region when the A-DCI is transmitted according to an embodiment of the present invention.

In LTE(-A), a new channel, E-PDCCH, is defined to transmit control information in a PDSCH region in consideration of shortage of resources, influence of interference, etc. with respect to the conventional PDCCH region. In the case of E-PDCCH, ECCEs are configured within a region defined as a plurality of PRB sets to perform DCI transmission. An E-PDCCH PRB set is defined as follows.

For each serving cell, one or two EPDDCH PRB sets for EPDCCH monitoring may be configured for a single UE through higher layer signaling. PRB pairs corresponding to an EPDCCH PRB set are indicated by higher layers. Each EPDCCH PRB set is composed of ECCEs 0 to $N_{ECCE,p,k}-1$ where $N_{ECCE,p,k}$ denotes the number of ECCEs in EPDCCH PRB set p in subframe k. Each EPDCCH PRB set may be configured for localized EPDCCH transmission or distributed EPDCCH transmission.

The UE needs to monitor a set of EPDCCH candidates in one or more activated serving cells for control information as set through higher layer signaling. Here, monitoring refers to an attempt to decode EPDCCHs in a set according to monitored DCI formats.

The set of EPDCCH candidates to be monitored is defined as an EPDCCH UE-specific search space. For each serving cell, subframes in which the UE monitors the E-PDCCH UE-specific search space are set by higher layers.

An SS is composed of a set of ECCEs according to a function defined as follows in the EPDCCH PRB set.

EPDCCH UE-specific search space $ES_k^{(L)}$ at aggregation level $L \in \{1, 2, 4, 8, 16, 32\}$ is defined by the set of EPDCCH candidates. For EPDCCH PRB set p of search space $ES_k^{(L)}$, ECCEs corresponding to EPDCCH candidate m are determined by the following mathematical expression.

$$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k}/L \rfloor \right\} + i \quad \text{[Expression 3]}$$

Here, $i=0, \ldots, L-1$, $b=n_{CI}$ if a carrier indicator field is set for the UE with respect to a serving cell in which EPDCCHs are monitored and $b=0$ if the carrier indicator field is not set. In addition, $n_{CI}$ denotes the value of the carrier indicator field, $m=0, 1, \ldots M_p^{(L)}-1$, and $M_p^{(L)}$ denotes the number of EPDCCH candidates to be monitored at aggregation level L in EPDCCH PRB set p.

When an ECCE corresponding to an EPDCCH candidate is mapped to a PRB set which overlaps with transmission of a PBCH or a primary or secondary synchronization signal in the frequency domain in the same subframe, the UE is not expected to monitor the EPDCCH candidate.

If the same DMRS scrambling sequence initialization parameter $n_{ID,i}^{EPDCCH}$ as two EPDCCH PRB sets is set for the UE, the UE receives an EPDCCH having a DCI payload size corresponding to one of the EPDCCH PRB sets, the UE receives an EPDCCH candidate which corresponds to one of the EPDCCH PRB sets, is mapped to only a predetermined set of REs and has a predetermined DCI payload size, the UE is configured to monitor an EPDCCH candidate which has the same DCI payload size, corresponds to the other EPDCCH PRB set and is mapped to the same set of REs, and a plurality of first ECCEs of the received EPDCCH candidate is used to determine a PUCCH resource for HARQ-ACK transmission, then the plurality of first ECCEs is determined based on EPDCCH PRB set p=0.

Variable $Y_{p,k}$ in Expression 3 is defined as follows.

$$Y_{p,k} = (A_p \cdot Y_{p,k-1}) \mod D \quad \text{[Equation 4]}$$

Here, $Y_{p,-1} = n_{RNTI} \neq 0$, $A_0 = 39827$, $A_1 = 39829$ $D=65537$ and $k = \lfloor n_s/2 \rfloor$ where $n_s$ denotes a slot number in a radio frame. In addition, $n_{RNTI}$ is an RNTI value used on uplink or downlink. DCI formats that need to be monitored by the UE depend on transmission mode set per serving cell.

Accordingly, a maximum of two EPDCCH PRB sets can be configured for the UE and the UE can detect DCI from each set. Here, when the A-DCI independently configured from the conventional DCI according to an embodiment of the present invention is introduced, a UE that supports NAIC needs to detect DCI used to receive data thereof and the A-DCI. If the DCI and the A-DCI are transmitted on EPDCCHs and the same type of EPDCCH PRB sets are configured for the DCI and the A-DCI, then the UE need to perform BD on the respective EPDCCH PRB sets. Accordingly, the present invention provides a method for configuring an E-PDCCH PRB set, which is independent of the E-PDCCH PRB set, for the DCI for data reception when the A-DCI is detected from the EPDCCH. For example, when EPDCCH PRB set 0 and EPDCCH PRB set 1 are configured for the NAIC UE, the UE may be configured to receive DCI for data reception in E-PDCCH PRB set 0 and to receive the A-DCI in E-PDCCH PRB set 1, thereby reducing the number of BD operations.

Figure 13:
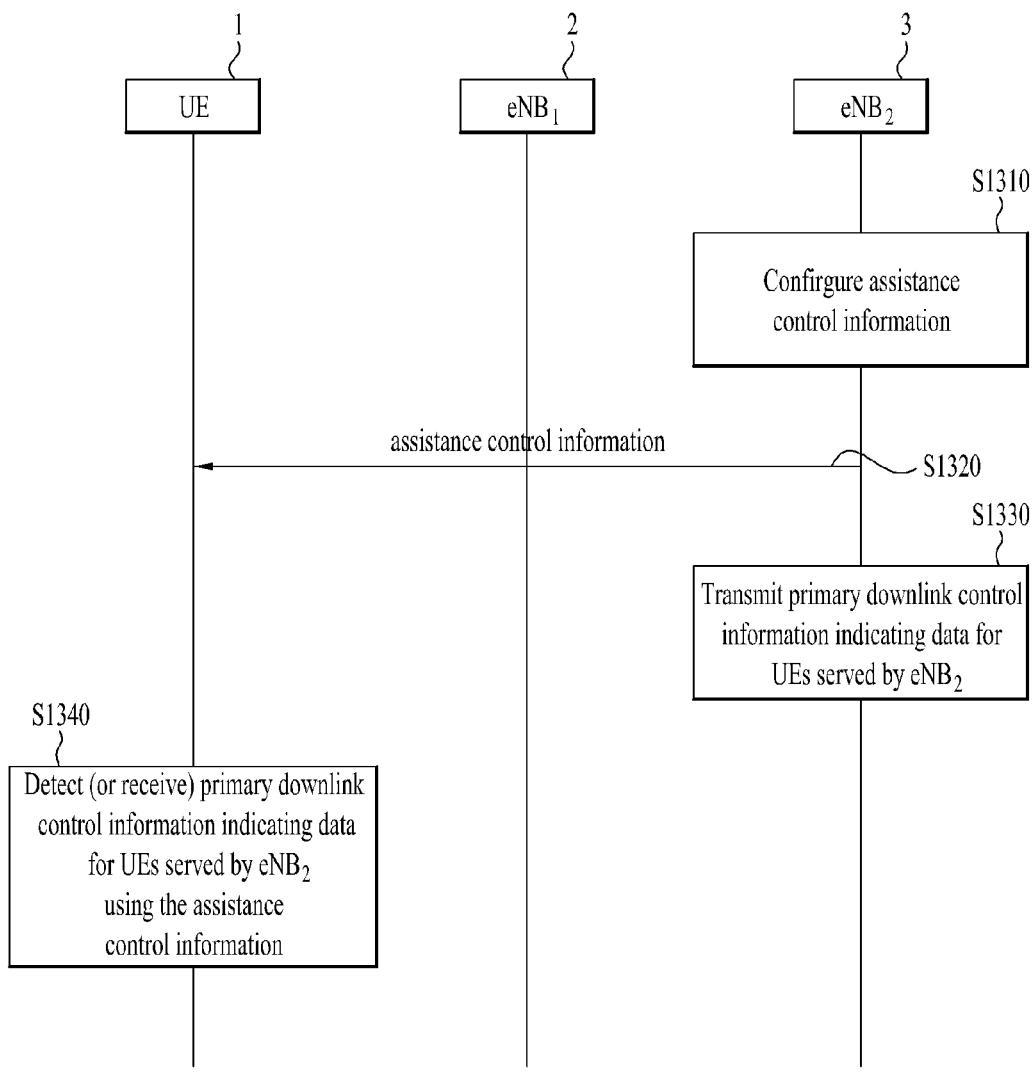
FIG. 13 shows an exemplary operation according to one embodiment of the present invention.

FIG. 13 illustrates a procedure according to an embodiment of the present invention. A wireless communication system according to an embodiment of the present invention includes A UE 1, eNB$_1$ 2, which is the serving eNB of the UE, and eNB$_1$ 3 of a neighboring cell and may further include more entities.

eNB$_1$ 3 may configure assistance control information for interference signal cancellation (S1310). The assistance control information may include at least one of CCE index of a control channel on which primary control information is transmitted, aggregation level, DCI format and CRC bits with respect to the control channel. In addition, the assistance control information may include sub-assistance control information about neighboring UEs which are simultaneously scheduled by the neighboring eNB.

Furthermore, eNB$_1$ 3 may transmit the assistance control information to UE 1 served by eNB$_1$ 2 (S1320). The assistance control information may be transmitted in a search space determined by a dedicated RNTI for the assistance control information. The dedicated RNTI may pre-provided to the UE 1 through higher layer signaling, for example.

When eNB$_1$ 3 and eNB$_1$ 2 are connected via an ideal backhaul link (not shown), eNB$_1$ 2 may obtain the assistance control information and thus transmit the assistance control information to UE 1 since it can be assumed that eNB$_1$ 3 and eNB$_1$ 2 can share information in real time. In this case, the assistance control information can be received at the CCE index following the last CCE index at which control information that indicates data for the UE 1 is received.

In addition, eNB$_1$ 3 may transmit primary downlink control information which indicates data for the UE served thereby, which causes interference applied to the UE 1 (S1330). The assistance control information and primary downlink control information may be transmitted in the same downlink subframe on a carrier. In this case, the assistance control information and primary downlink control information can be simultaneously transmitted in terms of the transmitting side (eNB$_2$), whereas the assistance control information can be regarded as being received prior to the primary downlink control information in terms of the receiving side (UE) since the primary downlink control information is received using the assistance control information.

Furthermore, eNB$_1$ 3 may transmit data for the UE served thereby, which causes interference. The data can be normally transmitted in the same downlink subframe in which the primary downlink control information is transmitted.

UE 1 may receive the primary downlink control information that indicates the interference data using the assistance control information (S1340). Then, UE 1 may detect the interference data from eNB$_1$ 3 using the received primary downlink control information and remove the detected interference data from received data.

While an embodiment of the present invention has been briefly described with reference to FIG. 13, the embodiment illustrated in FIG. 13 may alternatively or additionally include some of the aforementioned embodiments.

Figure 14:
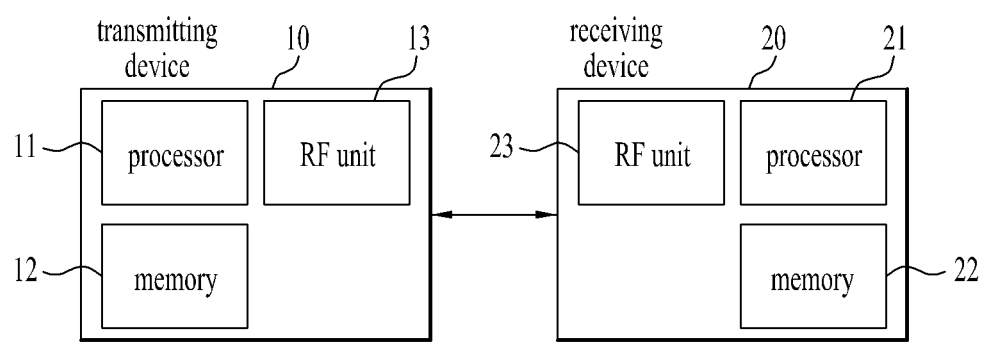
FIG. 14 shows a block diagram of apparatuses to implement embodiment(s) of the present invention.

FIG. 14 is a block diagram showing components of a transmitter 10 and a receiver 20 for performing the embodiments of the present invention. The transmitter 10 and the receiver 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer. The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), Digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitter 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiver 20 is the inverse of signal processing of the transmitter 10. Under control the processor 21, the RF unit 23 of the receiver 20 receives a radio signal transmitted by the transmitter 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitter 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiver 20. A reference signal (RS) transmitted in correspondence with the antenna defines the antenna viewed from the viewpoint of the receiver 20 and enables the receiver 20 to perform channel estimation of the antenna regardless of whether the channel is a single radio channel from a single physical antenna or a composite channel from a plurality of physical antennal elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operate as the transmitter 10 in uplink and operates as the receiver 20 in downlink. In the embodiments of the present invention, a BS operates as the receiver 20 in uplink and operates as the transmitter 10 in downlink.

The transmitter and/or the receiver may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention may be used for a wireless communication apparatus such as a user equipment (UE), a relay and a base station (BS).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for receiving, by a user equipment (UE), information for interference cancellation, the method comprising:
receiving assistance control information for removing interference data from a neighboring evolved-NodeB (eNB); and
receiving primary control information indicating the interference data using the assistance control information,
wherein the assistance control information includes at least one of control channel element (CCE) indices, an aggregation level and a downlink control information (DCI) format of a control channel on which the primary control information is transmitted and cyclic redundancy check (CRC) bits for the control channel, wherein the assistance control information includes sub-assistance control information on neighboring UEs simultaneously scheduled by the neighboring eNB, and wherein the assistance control information is received at the CCE index following the last CCE index at which control information indicating data for the UE is received.

2. The method according to claim 1, further comprising receiving the assistance control information in a search space determined based on a dedicated RNTI for the assistance control information.

3. The method according to claim 2, wherein the dedicated RNTI is received through a higher layer signal.

4. The method according to claim 1, further comprising:
detecting the interference data from the neighboring eNB using the received primary control information; and
removing the detected interference data from total received data.

5. The method according to claim 1, further comprising:
receiving information on an aggregation level for the assistance control information through a higher layer signal,
wherein the aggregation level of an assistance control channel on which the assistance control information is transmitted is limited to part of all aggregation levels available for control channels.

6. The method according to claim 1, wherein, when the assistance control information includes a plurality of sub-assistance control informations respectively configured for each of a plurality of neighboring UEs simultaneously scheduled by the neighboring eNB, a flag bit field for indicating whether a subsequent sub-assistance control information follows is added to each of back end of the plurality of the sub-assistance control information.

7. The method according to claim 1, wherein the assistance control information is included in control information indicating data for the UE and received from a serving eNB of the UE.

8. The method according to claim 1, wherein the assistance control information is received from the neighboring eNB.

9. The method according to claim 1, wherein, when the assistance control information is received on an enhanced physical downlink control channel (EPDCCH), an EPDCCH physical resource block (PRB) set for the assistance control information is configured independently of an EPDCCH PRB set for control information indicating data for the UE.

10. A method for transmitting, by an evolved-NodeB (eNB), information for interference cancellation of a user equipment (UE) (referred to as a neighboring UE) served by a neighboring eNB, the method comprising:
transmitting primary control information indicating data for at least one serving UE; and
transmitting assistance control information for interference cancellation,
wherein the assistance control information includes at least one of CCE indices, an aggregation level and a DCI format of a control channel on which the primary control information is transmitted and CRC bits for the control channel,
wherein the assistance control information includes sub-assistance control information on neighboring UEs simultaneously scheduled by the eNB, and
wherein the assistance control information is transmitted at the CCE index following the last CCE index at which control information indicating data for the UE is received.

11. The method according to claim 10, further comprising transmitting the assistance control information in a search space determined based on a dedicated RNTI for the assistance control information.

12. The method according to claim 10, further comprising:
transmitting information on an aggregation level for the assistance control information,
wherein the aggregation level of an assistance control channel on which the assistance control information is transmitted is limited to part of all aggregation levels available for control channels.

13. The method according to claim 10, wherein, when the assistance control information includes a plurality of sub-assistance control informations respectively configured for each of a plurality of neighboring UEs simultaneously scheduled by the eNB, a flag bit field for indicating whether a subsequent sub-assistance control information follows is added to each of back end of the plurality of the sub-assistance control information.

14. The method according to claim 10, wherein, when the assistance control information is transmitted on an EPDCCH, an EPDCCH PRB set for the assistance control information is configured independently of an EPDCCH PRB set for control information indicating data for the UE.

15. A user equipment (UE) configured to receive information for interference cancellation, comprising:
a radio frequency (RF) unit; and
a processor configured to:
receive assistance control information for removing interference data from a neighboring evolved-NodeB (eNB); and
receive primary control information indicating the interference data using the assistance control information,
wherein the assistance control information includes at least one of CCE indices, an aggregation level and a DCI format of a control channel on which the primary control information is transmitted and CRC bits for the control channel,
wherein the assistance control information includes sub-assistance control information on neighboring UEs simultaneously scheduled by the neighboring eNB, and
wherein the assistance control information is received at the CCE index following the last CCE index at which control information indicating data for the UE is received.

16. An evolved-NodeB (eNB) configured to transmit information for interference cancellation of a user equipment (UE) (referred to as a neighboring UE) served by a neighboring eNB, comprising:
an RF unit; and
a processor:
transmit primary control information indicating data for at least one serving UE; and
transmit assistance control information for interference cancellation,
wherein the assistance control information includes at least one of CCE indices, an aggregation level and a DCI format of a control channel on which the primary control information is transmitted and CRC bits regarding the control channel,
wherein the assistance control information includes sub-assistance control information about neighboring UEs simultaneously scheduled by the eNB, and wherein the assistance control information is transmitted at the CCE index following the last CCE index at which control information indicating data for the UE is received.

* * * * *